(12) United States Patent
Gao

(10) Patent No.: US 11,909,949 B2
(45) Date of Patent: Feb. 20, 2024

(54) DISPLAY PANEL, DISPLAY METHOD THEREOF AND DISPLAY DEVICE

(71) Applicant: BOE TECHNOLOGY GROUP CO., LTD., Beijing (CN)

(72) Inventor: Jian Gao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/765,504

(22) PCT Filed: May 8, 2021

(86) PCT No.: PCT/CN2021/092299
§ 371 (c)(1),
(2) Date: Mar. 31, 2022

(87) PCT Pub. No.: WO2021/244216
PCT Pub. Date: Dec. 9, 2021

(65) Prior Publication Data
US 2022/0394236 A1 Dec. 8, 2022

(30) Foreign Application Priority Data

Jun. 5, 2020 (CN) .......................... 202010504934.4

(51) Int. Cl.
*H04N 13/366* (2018.01)
*H04N 13/305* (2018.01)
(Continued)

(52) U.S. Cl.
CPC ......... *H04N 13/366* (2018.05); *H04N 13/305* (2018.05); *H04N 13/31* (2018.05); *H04N 13/356* (2018.05)

(58) Field of Classification Search
CPC .... H04N 13/366; H04N 13/305; H04N 13/31; H04N 13/356; H04N 13/351; G02B 30/27; G09F 9/30
(Continued)

(56) References Cited

U.S. PATENT DOCUMENTS

2006/0291052 A1* 12/2006 Lipton ................... G02B 30/29
359/463
2014/0198188 A1* 7/2014 Izawa .................. H04N 13/106
348/49
(Continued)

FOREIGN PATENT DOCUMENTS

CN     101023389 A     8/2007
CN     101201498 A     6/2008
(Continued)

OTHER PUBLICATIONS

China Patent Office, CN202010504934.4 First Office Action dated Aug. 4, 2021.

*Primary Examiner* — Tung T Vo
(74) *Attorney, Agent, or Firm* — HOUTTEMAN LAW LLC

(57) ABSTRACT

A display panel, a display method thereof and a display device are provided. The display panel includes cylindrical lens array on light emitting side of display substrate. The display substrate includes back plate, pixel definition layer and sub-pixel unit array on back plate. Each sub-pixel unit is in pixel region defined by pixel definition layer and includes at least two secondary sub-pixels; and cylindrical lenses are corresponding to sub-pixel units, each cylindrical lens has cylindrical surface away from back plate, and focus point on surface of a sub-pixel unit away from back plate. In the display panel, multi-viewpoints parallax 3D display compatible with near-to-eye light field display and 2D display with sub-pixels of same gray scale is achieved,
(Continued)

effectively reducing the crosstalk, improving Moire phenomenon and increasing stereo perception of the parallax 3D display and solving visual fatigue due to conflict between monocular focusing and binocular convergence.

13 Claims, 10 Drawing Sheets

(51) Int. Cl.
   *H04N 13/31* (2018.01)
   *H04N 13/356* (2018.01)

(58) Field of Classification Search
   USPC .......................................................... 348/51
   See application file for complete search history.

(56) References Cited

U.S. PATENT DOCUMENTS

| | | | |
|---|---|---|---|
| 2014/0333532 A1* | 11/2014 | Ohbitsu | G06F 3/013 345/156 |
| 2015/0022440 A1 | 1/2015 | Liu et al. | |
| 2017/0150131 A1* | 5/2017 | Van Putten | H04N 13/305 |
| 2018/0003995 A1 | 1/2018 | Bui | |

FOREIGN PATENT DOCUMENTS

| | | |
|---|---|---|
| CN | 102566059 A | 7/2012 |
| CN | 103945203 A | 7/2014 |
| CN | 103995361 A | 8/2014 |
| CN | 104320648 A | 1/2015 |
| CN | 104570370 A | 4/2015 |
| CN | 105143963 A | 12/2015 |
| CN | 106291958 A | 1/2017 |
| CN | 110824725 A | 2/2020 |
| CN | 111223904 A | 6/2020 |
| CN | 111552093 A | 8/2020 |

* cited by examiner

DISPLAY PANEL, DISPLAY METHOD THEREOF AND DISPLAY DEVICE

CROSS REFERENCE TO RELATED APPLICATION

This is a National Phase Application filed under 35 U.S.C. 371 as a national stage of PCT/CN2021/092299, filed on May 8, 2021.

TECHNICAL FIELD

The present disclosure relates to the field of display technology, in particular to a display panel, a display method thereof and a display device.

BACKGROUND 2D display is the flat display.

Parallax 3D display: as shown in FIG. 1, a parallax 3D scene changes with a viewing visual angle.

True 3D display, as shown in FIGS. 2a and 2b, may be used to view different depths of field by focusing with a monocular crystalline lens as in the case of viewing the real world, so as to realize a transformation between clear and blurry in different depths of field, and such 3D display solves the problem of a visual fatigue due to a conflict between the monocular focusing and a binocular convergence.

SUMMARY

The embodiment of the present disclosure provides a display panel, a display method thereof and a display device.

In a first aspect, an embodiment of the present disclosure provides a display panel, including a display substrate, a cylindrical lens array including cylindrical lenses on a light emitting side of the display substrate, wherein the display substrate includes a back plate, a pixel definition layer and a sub-pixel unit array including sub-pixel units on the back plate, wherein each of the sub-pixel units is in a pixel region defined by the pixel definition layer and includes at least two secondary sub-pixels; and the cylindrical lenses are arranged corresponding to the sub-pixel units, each cylindrical lens has a cylindrical surface away from the back plate, and a focus point on a surface of a corresponding sub-pixel unit away from the back plate.

In some embodiments, the secondary sub-pixels are arranged in a first direction; an axis of the cylindrical lens is perpendicular to the first direction; an extending direction of the axis is a second direction; the display substrate has a shape of rectangle, a long side of the display substrate extends along the first direction, and a wide side of the display substrate extends along the second direction; the sub-pixel unit has a shape of rectangle, a long side of the sub-pixel unit extends in the first direction, and a wide side of the sub-pixel unit extends in the second direction; and the secondary sub-pixel has a shape of rectangle, a wide side of the secondary sub-pixel extends in the first direction, and a long side of the secondary sub-pixel extends in the second direction.

In some embodiments, the sub-pixel units in the sub-pixel unit array have the same size and shape; and the secondary sub-pixels in each sub-pixel unit have the same size and shape.

In some embodiments, a main lobe visual angle of the cylindrical lens and a focal length of the cylindrical lens satisfy:

$$\tan\frac{\omega}{2} = \frac{Np_y}{2f}; \frac{\alpha}{\omega/N} = i$$

where $\omega$ is the main lobe visual angle of the cylindrical lens; N is a number of the secondary sub-pixels in the sub-pixel unit; $p_y$ is a distance between centers of two adjacent secondary sub-pixels in the sub-pixel unit; f is the focal length of the cylindrical lens; i=1, 2, 3 . . . , i being an integer; and a is an included angle of a pupil distance of human eyes with respect to the display substrate.

In some embodiments, an orthographic projection of the cylindrical lens on the back plate falls within an orthographic projection of the corresponding sub-pixel unit on the back plate; and
an aperture of the cylindrical lens satisfies:

$$\frac{D_y}{y} = \frac{W_{lens}}{W_{panel}} = \frac{L}{L+f}$$

where Dy is the aperture of the cylindrical lens; y is a length of the sub-pixel unit along the first direction; $W_{lens}$ is a length of the cylindrical lens array along the first direction; $W_{panel}$ is a length of the display substrate along the first direction; L is an optimal viewing distance of the display panel during a parallax 3D display; f is the focal length of the cylindrical lens.

In some embodiments, the display panel further includes m layers between the cylindrical lens and the sub-pixel unit, wherein
a distance H between a vertex of a cylindrical surface of the cylindrical lens and a surface of the sub-pixel unit away from the back plate, satisfies:

$$h/n + h1/n1 + h2/n2 + \ldots + hm/nm = f; H = h + h1 + h2 + \ldots + hm,$$

where h is a thickness of the cylindrical lens, and n is the refractive index of the cylindrical lens; h1 is a thickness of a first layer between the cylindrical lens and the sub-pixel unit, and n1 is a refractive index of the first layer; h2 is a thickness of a second layer between the cylindrical lens and the sub-pixel unit, and n2 is a refractive index of the second layer; hm is a thickness of an $m^{th}$ layer between the cylindrical lens and the sub-pixel unit, and nm is a refractive index of the $m^{th}$ layer; and f is the focal length of the cylindrical lens.

In some embodiments, in the sub-pixel unit array, a spatial projection of views formed by secondary sub-pixels arranged at same positions has a width $a_y$ along the first direction in a cross section at the optimal viewing distance for the display panel during the parallax 3D display, which satisfies:

$$a_y = \frac{Lt_y}{f}; \text{ and } a_y \le e \text{`} Na_y \ge e,$$

where L is the optimal viewing distance for the display panel during the parallax 3D display; $t_y$ is a width of the secondary sub-pixel along the first direction; f is the focal length of the cylindrical lens; N is the number of secondary sub-pixels in the sub-pixel unit; e is the pupil distance of the human eyes;

in the sub-pixel unit array, a spatial projection of views formed by adjacent secondary sub-pixels has a pitch $b_y$ along the first direction in a cross section at a closest viewing distance for the display panel during the parallax 3D display, which satisfies:

$$b_y = \frac{w_y a_y}{w_y + a_y}; \text{ and } (N-1)b_y \geq e;$$

where $W_y$ is a length of the display substrate along the first direction; and in the sub-pixel unit array, the spatial projection of views formed by adjacent secondary sub-pixels has a pitch $c_y$ along the first direction in a cross section at a farthest viewing distance for the display panel during the parallax 3D display, which satisfies:

$$c_y = \frac{w_y a_y}{w_y - a_y}; \text{ and } c_y \leq e.$$

In some embodiments, in the sub-pixel unit array, the width of the spatial projection of views formed by the secondary sub-pixels arranged at a same position along the first direction in the cross section at the optimal viewing distance for the display panel during the parallax 3D display, is equal to a center pitch of the spatial projection of views formed by adjacent secondary sub-pixels along the first direction in the cross section at the optimal viewing distance for the display panel during the parallax 3D display.

In some embodiments, a width of a non-light emitting region between adjacent sub-pixels in the sub-pixel unit in the first direction is 0.05 μm or less.

In some embodiments, a view region formed by the light emitted by the secondary sub-pixels propagating to a position of a pupil of the human eye has a size along the first direction, which is smaller than or equal to a size of a half pupil of the human eye.

In some embodiments, a distance L between the pupil of the human eye and the display panel, satisfies:

$$6 \text{ mm} \leq L \leq \frac{\Phi/2}{2\tan\left(\frac{\omega/N}{2}\right)}$$

where 6 mm is a minimum distance at which eyelashes do not contact the cylindrical lenses array; $\Phi$ is a diameter of the pupil of the human eye; $\omega$ is the main lobe visual angle of the cylindrical lens; N is the number of the secondary sub-pixels in the sub-pixel unit.

In some embodiments, a number M of the light rays entering the human eye during the 3D light field display of the display panel, satisfies:

$$M = INT\left[\frac{\Phi}{2L\tan\left(\frac{\omega/N}{2}\right)}\right] * INT\left(\frac{v}{y}\right) * Z$$

where INT is a rounding-down function, $v=2L \tan(\omega/2)$, and Z is a number of sub-pixel units arranged along the second direction in the display substrate; $\Phi$ is the diameter of the pupil of the human eye; $\omega$ is the main lobe visual angle of the cylindrical lens; N is the number of the secondary sub-pixels in sub-pixel unit.

In some embodiments, an imaging angle resolution β of the display panel during the 3D light field display, satisfies:

$$\beta = \frac{D_y}{L} * \frac{180}{\pi} * 60$$

where Dy is the aperture of the cylindrical lens; L is the distance between the pupil of the human eye and the display panel.

In a second aspect, an embodiment of the present disclosure provides a display device, including the above display panel.

In a third aspect, an embodiment of the present disclosure provides a display method of a display panel, wherein the display panel is the above display panel, the display method includes steps of:

inputting image signals with different parallaxes to the secondary sub-pixels in the sub-pixel unit of the display panel during the parallax 3D display of the display panel; and inputting image signals with a same parallax to the secondary sub-pixels in the sub-pixel unit of the display panel during the 2D display of the display panel.

In some embodiments, the display panel is the above display panel, the display method includes:

inputting light field image signals to the secondary sub-pixels in the sub-pixel unit of the display panel during the light field 3D display of the display panel.

In the display panel provided by the embodiment of the present disclosure, the sub-pixel unit includes at least two secondary sub-pixels, and the focus point of each cylindrical lens is located on the surface of a corresponding sub-pixel unit away from the back plate, such that the secondary sub-pixels form at least two view regions on a visual space, and by controlling a gray scale of the secondary sub-pixel and adjusting a viewing distance, a multi-viewpoints parallax 3D display compatible with the near-to-eye light field display and a 2D display with the secondary sub-pixels of a same gray scale is achieved. In this way, the display panel not only may effectively reduce the crosstalk of parallax 3D display, but also improve the Moire phenomenon during the parallax 3D display and increase the stereo perception of the parallax 3D display. In addition, the display panel is compatible with the near-to-eye light field display (that is, the true 3D display), which may solve the visual fatigue due to a conflict between the monocular focusing and the binocular convergence.

In the display device provided by the embodiment of the present disclosure, by adopting the above display panel, the display effect of the parallax 3D display of the display device may be improved, the display device may be compatible with the light field 3D display, and the effect of the light field 3D display of the display device may be improved.

BRIEF DESCRIPTION OF DRAWINGS

The accompanying drawings, which are provided for further understanding of the present disclosure and constitute a part of this specification, are for explaining the present disclosure together with the following exemplary embodiments, but are not intended to limit the present disclosure. The above and other features and advantages will become more apparent to one of ordinary skill in the art by describing in detail exemplary embodiments thereof with reference to the attached drawings. In the drawings.

Figure 1:
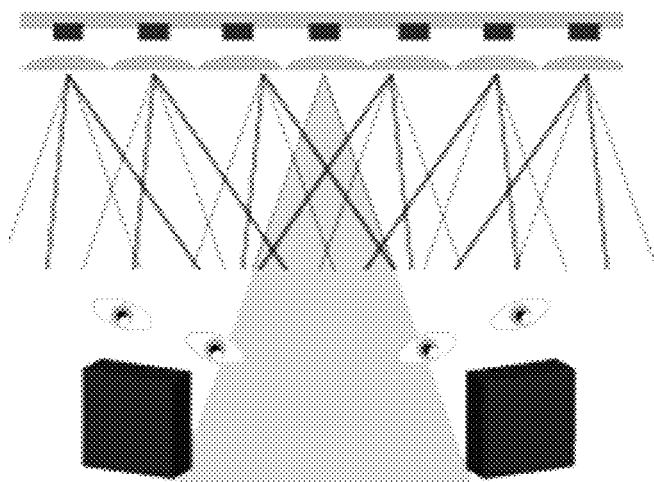
FIG. 1 is a schematic diagram showing that a parallax 3D scene changes with a viewing visual angle.
Figure 2A:
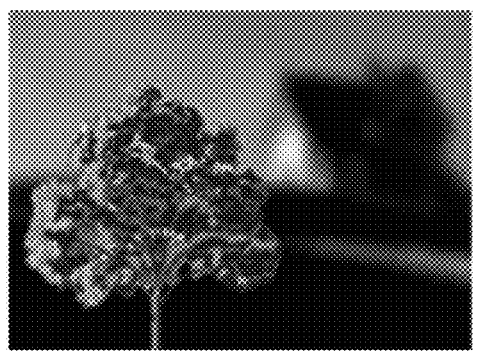
FIG. 2a is a schematic diagram of a true 3D display of clear and blurry scenes in different depths of field.
Figure 2B:
FIG. 2b is a schematic diagram of a true 3D display of transformation between clear and blurry scenes in different depths of field.

Reference numbers are:
1. A display substrate; 11. a back plate; 12. a pixel definition layer; 13. a sub-pixel unit; 130. a secondary sub-pixel; 14. an encapsulation layer; 15. a circular polarizer; 2. a cylindrical lens; Y. a first direction; X. a second direction.

DETAIL DESCRIPTION OF EMBODIMENTS

In order to enable one of ordinary skill in the art to better understand the technical solutions of the embodiments of the present disclosure, a display panel, a display method thereof and a display device will be described in further detail with reference to the accompanying drawings and the detailed description.

The embodiments of the present disclosure will be described more fully hereinafter with reference to the accompanying drawings, but the embodiments shown may be embodied in different forms and should not be construed as limited to the embodiments set forth herein. Rather, these embodiments are provided so that this disclosure will be thorough and complete, and will fully convey the scope of the present disclosure to one of ordinary skill in the art.

The embodiments of the present disclosure are not limited to the embodiments shown in the drawings, but include modifications of configurations formed based on a manufacturing process. Thus, regions illustrated in the drawings are schematic, and shapes of the regions shown in the drawings illustrate specific shapes of the regions, but are not intended to be limited.

In a parallax 3D display in the related art, an optical device (such as a cylindrical lens) disposed on an OLED (organic light-emitting diode) display substrate is designed to be out of focus. That is, a focal point of the optical device is away from a surface of a light-emitting element (composed of an anode, a light-emitting functional layer and a cathode stacked in sequence), causing a high crosstalk of the parallax 3D display and a poor display effect. The current parallax 3D display cannot be compatible with near-to-eye light field display (i.e., true 3D display), and thus, cannot solve the problem of a visual fatigue due to a conflict between the monocular focusing and a binocular convergence. In addition, in the current parallax 3D display substrate, sub-pixel units are still independently arranged. That is, a single sub-pixel is arranged in a sub-pixel island defined by a pixel definition layer, and the sub-pixels are discontinuously distributed, so that a Moire phenomenon occurs during the display. In the current parallax 3D display, the crosstalk and the Moire fringe have a restriction relation therebetween. That is, the influence of the Moire fringes is eliminated so the crosstalk among views is increased, thereby causing a small stereo perception of the parallax 3D display.

In view of the above problems in the current parallax 3D display, exemplary embodiments of the present disclosure provide a display panel, a display method thereof, and a display device.

Figure 3:
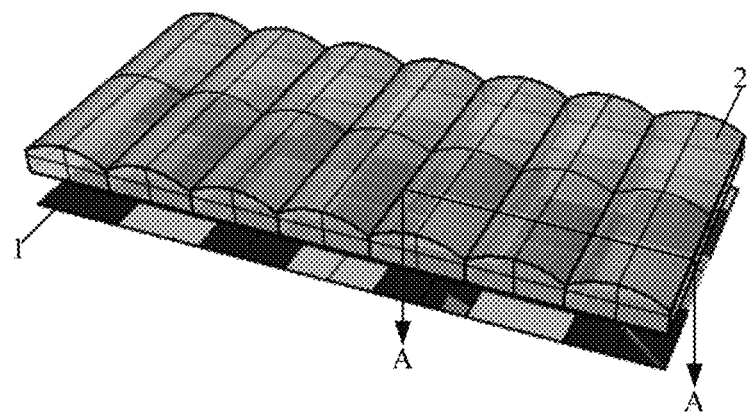
FIG. 3 is a schematic diagram of a structure of a display panel according to an embodiment of the present disclosure.
Figure 4:
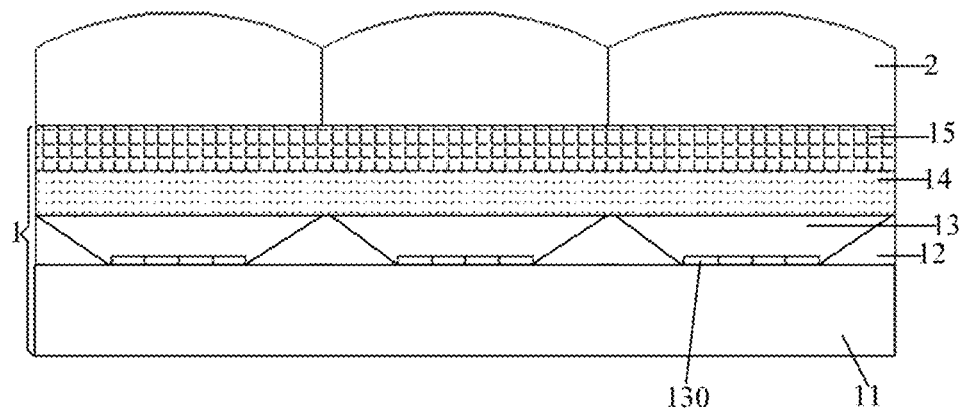
FIG. 4 is a cross-sectional view of a structure of the display panel shown in FIG. 3 taken along a line AA.

An exemplary embodiment of the present disclosure provides a display panel, as shown in FIGS. 3 and 4, including a display substrate 1, an array of cylindrical lenses (cylindrical lens array) 2 disposed on a light-emitting side of the display substrate 1. The display substrate 1 includes a back plate 11, a pixel definition layer 12 and an array of sub-pixel units (sub-pixel unit array) 13 arranged on the back plate 11. The sub-pixel units 13 are positioned in a pixel region defined by the pixel definition layer 12. Each of the sub-pixel units 13 includes at least two secondary sub-pixels 130; the cylindrical lenses 2 are arranged in one-to-one correspondence with the sub-pixel units 13, a cylindrical surface of each cylindrical lens 2 is away from the back plate 11, and a focus point of each cylindrical lens 2 is located on a surface of a corresponding sub-pixel unit 13 away from the back plate 11.

The sub-pixel unit 13 refers to a sub-pixel in a pixel unit. In the embodiment of the present disclosure, one sub-pixel is composed of at least two secondary sub-pixels 130, that is, one sub-pixel is divided into a plurality of secondary sub-pixels. The cylindrical lenses 2 are provided in one-to-one correspondence with the sub-pixel units 13. The sub-pixel units 13 include red sub-pixel units, green sub-pixel units, or blue sub-pixel units. Each secondary sub-pixel in the red sub-pixel unit emits red light; each secondary sub-pixel in the green sub-pixel unit emits green light; each secondary sub-pixel in the blue sub-pixel unit emits blue light. Each secondary sub-pixel is composed of an anode, a light-emitting functional layer and a cathode sequentially stacked. Thus, the display substrate 1 is an OLED display substrate.

The sub-pixel unit 13 includes at least two secondary sub-pixels 130, and the focus point of each cylindrical lens 2 is located on the surface of a corresponding sub-pixel unit 13 away from the back plate 11, such that the secondary sub-pixels 130 form at least two view regions in a visual space, and by controlling a gray scale of a secondary sub-pixel 130 and adjusting a viewing distance, a multi-viewpoints parallax 3D display compatible with the near-to-eye light field display and a 2D display with secondary sub-pixels 130 of a same gray scale is achieved. In this way, the display panel not only may effectively reduce the crosstalk of parallax 3D display, but also improve the Moire phenomenon during the parallax 3D display and increase the stereo perception of the parallax 3D display. In addition, the display panel is compatible with the near-to-eye light field display (that is, the true 3D display), which may solve the visual fatigue due to a conflict between the monocular focusing and the binocular convergence.

Figure 5:
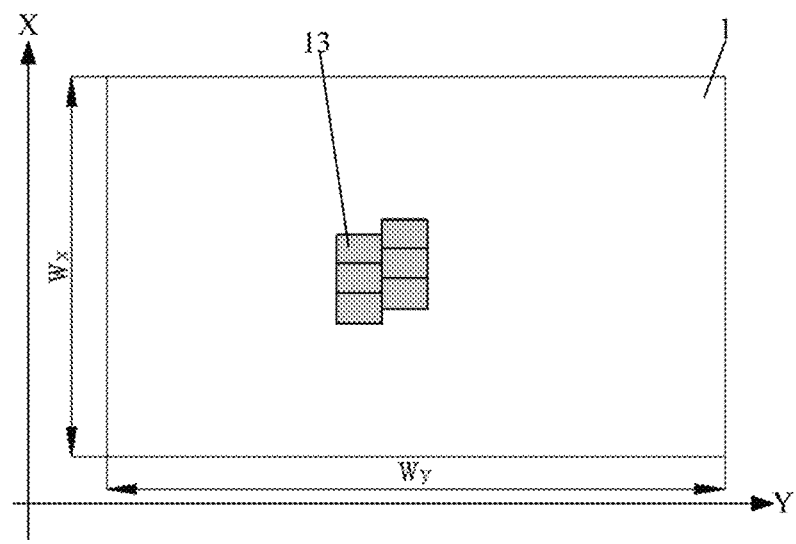
FIG. 5 is a schematic top view illustrating a structure of a display substrate in a display panel according to an embodiment of the present disclosure.
Figure 6:
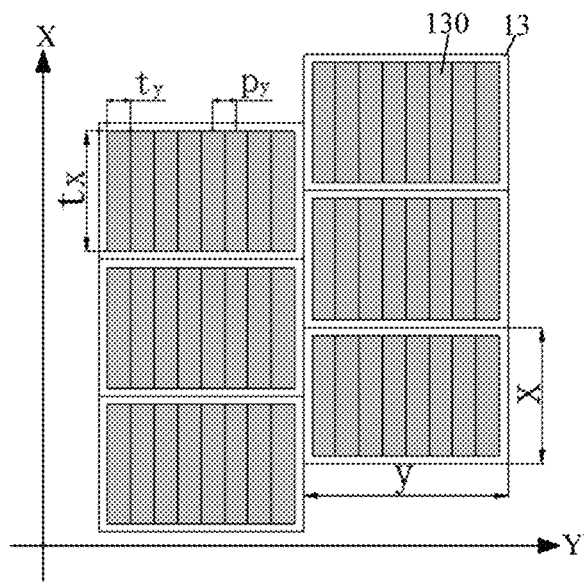
FIG. 6 is an enlarged view of a structure of a sub-pixel unit shown in FIG. 5.

In some embodiments, as shown in FIGS. 5 and 6, the secondary sub-pixels 130 are arranged along a first direction Y; an axis of the cylindrical lens is perpendicular to the first direction Y; an extending direction of the axis of the cylindrical lens is a second direction X; the display substrate 1 is rectangular, a long side of the display substrate 1 extends along the first direction Y, and a wide side of the display substrate 1 extends along the second direction X; the sub-pixel unit 13 is rectangular, a long side of the sub-pixel unit 13 extends in the first direction Y, and a wide side of the sub-pixel unit 13 extends in the second direction X; the secondary sub-pixel 130 is rectangular, a wide side of the secondary sub-pixel 130 extends in the first direction Y, and a long side of the secondary sub-pixel 130 extends in the second direction X.

In some embodiments, the sub-pixel units 13 in the array of sub-pixel units 13 have the same size and shape; the secondary sub-pixels 130 in the sub-pixel unit 13 have the same size and shape.

In some embodiments, respective parameters of the display substrate are shown in table 1, and calculation results of some design parameter for cylindrical lenses are derived from the data in table 1.

TABLE 1

| No. | Pitch between sub-pixel units (μm) | Number of secondary sub-pixels N | x × y (μm) | $p_y$ (μm) | $t_x \times t_y$ (μm) | Wx × Wy (mm) |
|---|---|---|---|---|---|---|
| 1 | 20 | 4 | 36.6 × 54.9 | 8.725 | 16.6 × 8.725 | 59.292 × 105.408 |
| 2 | 20 | 6 | 36.6 × 54.9 | 5.817 | 16.6 × 5.817 | 59.292 × 105.408 |
| 3 | 20 | 12 | 36.6 × 54.9 | 2.908 | 16.6 × 2.908 | 59.292 × 105.408 |
| 4 | 16 | 4 | 36.6 × 54.9 | 9.725 | 20.6 × 9.725 | 59.292 × 105.408 |
| 5 | 16 | 6 | 36.6 × 54.9 | 6.483 | 20.6 × 6.483 | 59.292 × 105.408 |
| 6 | 16 | 12 | 36.6 × 54.9 | 3.242 | 20.6 × 3.242 | 59.292 × 105.408 |

Figure 7:
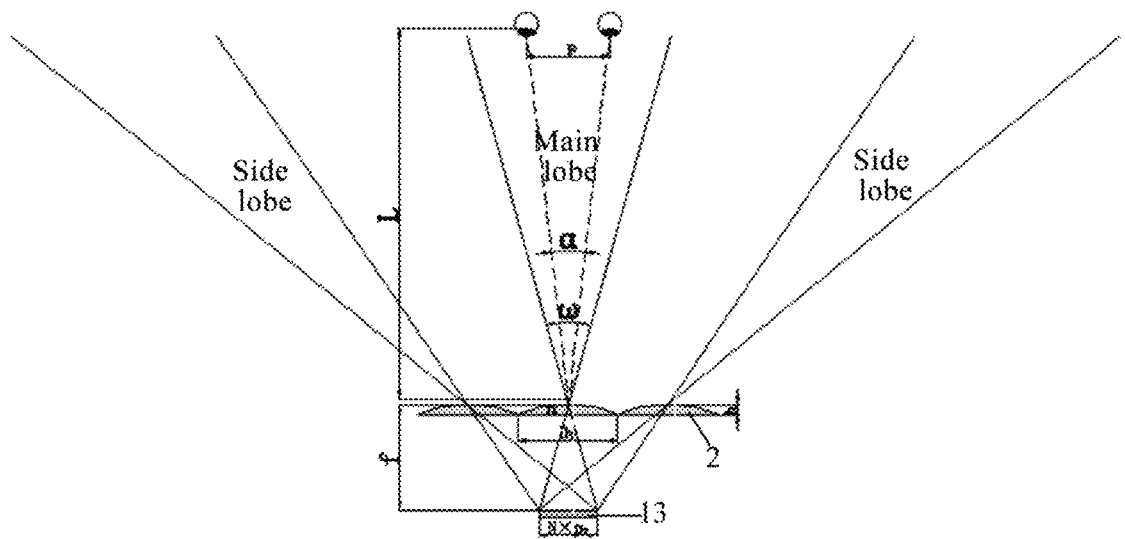
FIG. 7 is a schematic diagram illustrating a visual angle of a main lobe of a cylindrical lens according to an embodiment of the present disclosure.

In some embodiments, as shown in FIG. 7, a visual angle of a main lobe (or called a main lobe visual angle) of the cylindrical lens 2 and a focal length of the cylindrical lens 2 satisfy:

$$\tan\frac{\omega}{2} = \frac{Np_y}{2f}; \frac{\alpha}{\omega/N} = i$$

where ω is the main lobe visual angle of the cylindrical lens 2; N is the number of secondary sub-pixels in a sub-pixel unit 13; $p_y$ is a distance between centers (a center pitch) of two adjacent secondary sub-pixels in the sub-pixel unit 13; f is the focal length of the cylindrical lens 2; i=1, 2, 3 . . . , i being an integer; and a is an included angle of the pupil distance p of the human eyes with respect to the display substrate.

Figure 8:
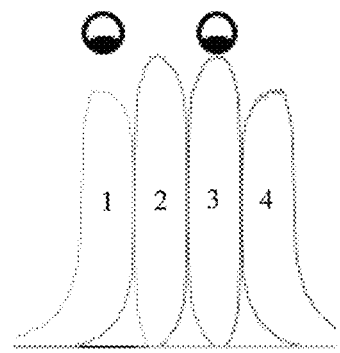
FIG. 8 is a schematic diagram illustrating that peaks of two different views may be ensured to enter a left eye and a right eye respectively at the same time when a parallax 3D display is realized according to an embodiment of the present disclosure.

As shown in FIG. 7, the main lobe visual angle of the cylindrical lens 2 is a visual angle formed by the cylindrical lens 2 and the corresponding sub-pixel unit 13, and ω≤27.4° may be derived from a process capability of the cylindrical lens 2 (D/f≤0.768, where D is an aperture of the cylindrical lens 2, and D≈54.9 μm) and the pitch between sub-pixel units of 20 μm in table 1. At the optimal viewing distance L for the parallax 3D display, a match relationship between the main lobe visual angle and the pupil distance p is as shown in FIG. 7. As shown in FIG. 8, in order to ensure that peak values of two different views (i.e., the views formed by two secondary sub-pixels arranged at different positions in the array of the sub-pixel units 13) may simultaneously enter the left eye and the right eye, respectively (for example, peak luminance of views 1 and 3 enters the left eye and the right eye, respectively, and FIG. 8 represents the energy distribution of four views propagating to the optimal viewing distance L), the main lobe visual angle of the cylindrical lens 2 must satisfy:

$$\frac{\alpha}{\omega/N} = i.$$

In this way, LUG parallax 3D display of the display panel may be realized. The main lobe visual angle and the focal length of the cylindrical lens calculated from the relevant parameters of the display substrate in table 1, and the specific data are shown in table 2.

TABLE 2

| No. | pitch between sub-pixel units (µm) | Number of secondary sub-pixels N | Views entering human eyes | Main lobe visual angle | Focal length f of cylindrical lens (µm) |
|---|---|---|---|---|---|
| 1 | 20 | 4 | 1, 3 | 21.09° | 93.75 |
| 2 | 20 | 6 | 1, 4 | 21.09° | 93.75 |
| 3 | 20 | 12 | 1, 6 | 25.13° | 78.29 |
| 4 | 16 | 4 | 1, 3 | 21.04° | 104.74 |
| 5 | 16 | 6 | 1, 4 | 21.04° | 104.74 |
| 6 | 16 | 12 | 1, 6 | 25.13° | 87.26 |

It should be noted that as long as the main lobe visual angle of the cylindrical lens 2 satisfies $$\frac{\alpha}{\omega/N} = i,$$

the peak values or two different views may be ensured to simultaneously enter the left eye and the right eye, respectively, so that the parallax 3D display with a larger stereo perception is realized; where i is an integer. For example, when i=1, peak luminance of views 1 and 2 enters the left and right eyes, respectively; when i=2, peak luminance of views 1 and 3 enters the left and right eyes, respectively; when i=3, peak luminance of views 1 and 4 enters the left and right eyes, respectively; and so on.

Figure 9:
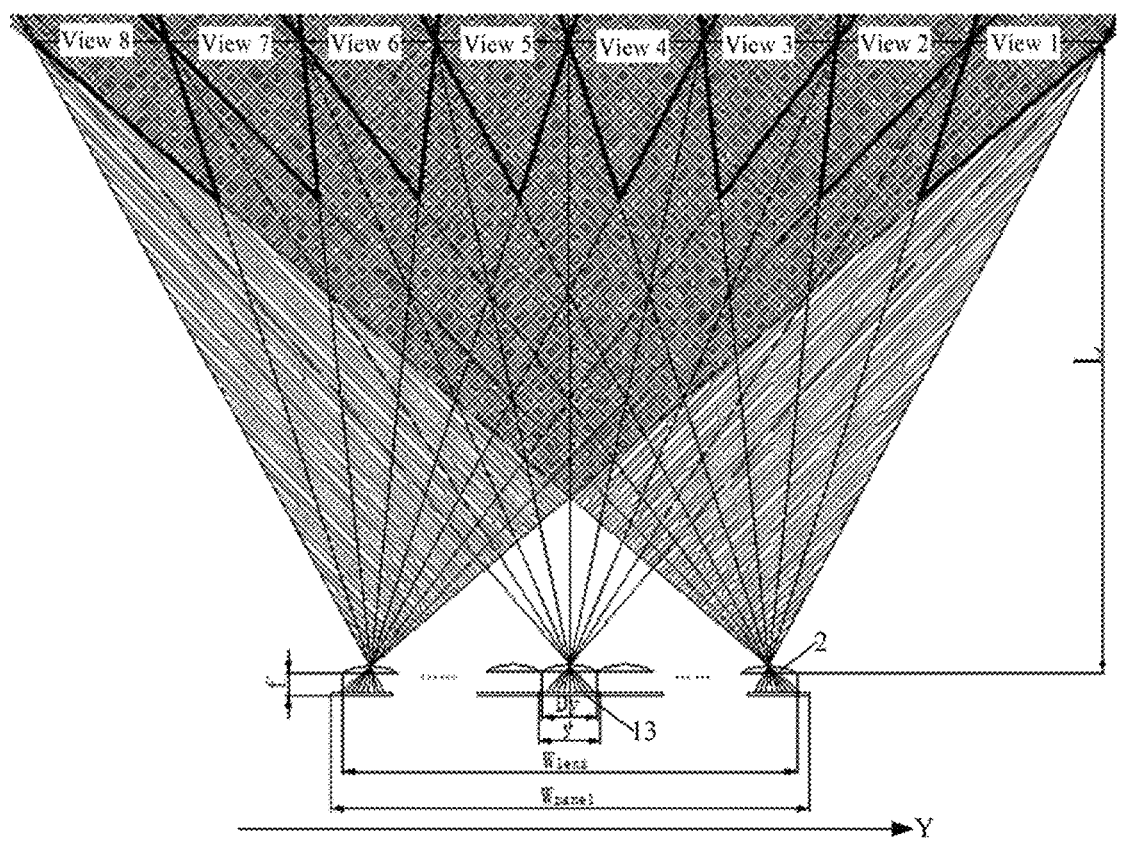
FIG. 9 is a schematic diagram illustrating view regions formed by sub-pixels in a sub-pixel unit for ensuring accuracy of parallax 3D image information according to an embodiment of the present disclosure.

In some embodiments, as shown in FIG. 9, an orthographic projection of the cylindrical lens 2 on the back plate falls within an orthographic projection of the corresponding sub-pixel unit 13 on the back plate; the aperture of the cylindrical lens 2 satisfies:

$$\frac{D_y}{y} = \frac{W_{lens}}{W_{panel}} = \frac{L}{L+f}$$

where Dy is the aperture of the cylindrical lens 2; y is a length of the sub-pixel unit 13 along the first direction Y; lens $W_{lens}$ a length of the array of cylindrical lenses 2 along the first direction Y; $W_{panel}$ is a length of the display substrate along the first direction Y; L is the optimal viewing distance of the display panel during the parallax 3D display; f is the focal length of the cylindrical lens 2. In order to ensure the correctness of the image information of the parallax 3D display, all of first secondary sub-pixels 1 (i.e., the secondary sub-pixels arranged at the same first positions, "position" herein means relative position rather than absolute position) in the sub-pixel unit 13 need to be projected to a view region 1, second secondary sub-pixels (i.e., the secondary sub-pixels arranged at the same second positions) need to be projected to a view region 2, and third secondary sub-pixels (i.e., the secondary sub-pixels arranged at same third positions) need to be projected to a view region 3 . . . , so that the aperture of the cylindrical lens 2 has a certain shrinking relationship with respect to the length of the sub-pixel unit 13 along the first direction Y. In the present embodiment, for example, it is derived from the relevant parameters of the display substrate shown in table 1:

$$\frac{D_y}{y} = \frac{W_{lens}}{W_{panel}} = \frac{L}{L+f} = 99.973\%.$$

Figure 10:
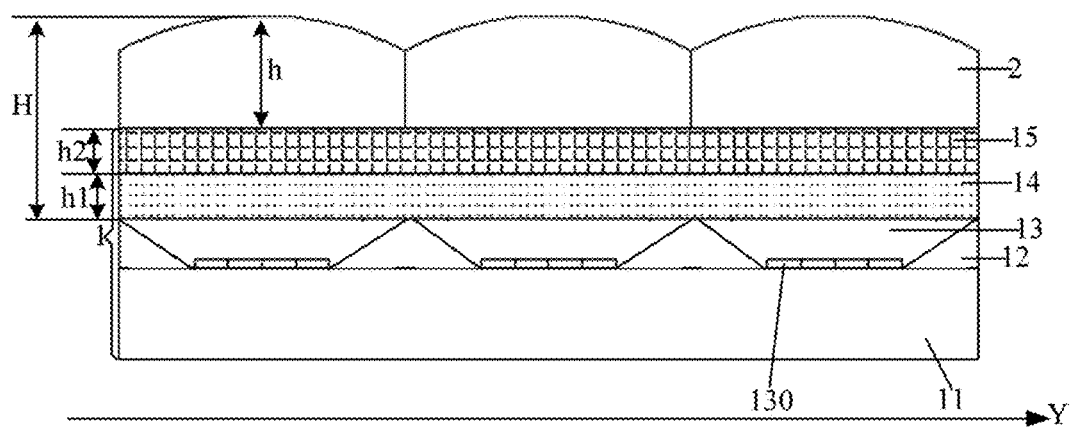
FIG. 10 is a schematic diagram of a placement height of a cylindrical lens according to an embodiment of the present disclosure.

In some embodiments, as shown in FIG. 10, m film layers are disposed between the cylindrical lens 2 and the sub-pixel unit 13, and a distance H between a vertex of a cylindrical surface of the cylindrical lens 2 and a surface of the sub-pixel unit 13 away from the back plate 11 satisfies:

h/n+h1/n1+h2/n2+ . . . +hm/nm=f;H=h+h1+h2+ . . . +hm;

where h is a thickness of the cylindrical lens 2, and n is the refractive index of the cylindrical lens 2; h1 is a thickness of a first layer between the cylindrical lens 2 and the sub-pixel unit 13, and n1 is the refractive index of the first layer; h2 is a thickness of a second layer between the cylindrical lens 2 and the sub-pixel unit 13, and n2 is the refractive index of the second layer; hm is a thickness of an $m^{th}$ layer between the cylindrical lens 2 and the sub-pixel unit 13, and nm is the refractive index of the $m^{th}$ layer; f is the focal length of the cylindrical lens 2. According to the above formula, the focal point of the cylindrical lens 2 may be located on the surface of the sub-pixel unit 13 away from the back plate 11, so that the crosstalk of parallax 3D display is effectively reduced, the display panel is compatible with the near-to-eye light field display (that is, the true 3D display), thereby solving the problem of a visual fatigue due to a conflict between the monocular focusing and a binocular convergence.

Figure 11:
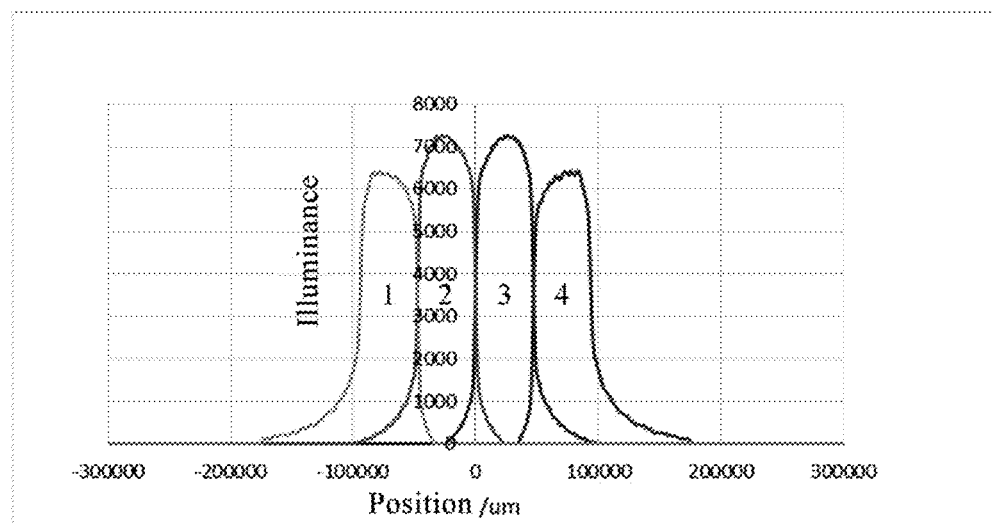
FIG. 11 is a schematic diagram illustrating a minimal crosstalk between views formed by adjacent sub-pixels after optimizing a placement height of a cylindrical lens according to an embodiment of the present disclosure.

For example, layers disposed between the cylindrical lens 2 and the sub-pixel unit 13 are: an encapsulation layer 14 and a circular polarizer 15, the encapsulation layer 14 includes three sub-layers made of different materials, and the circular polarizer 15 includes four sub-layers made of different materials. The arrangement of the layers between the cylindrical lens 2 and the sub-pixel unit 13 is specifically as shown in table 3, the distance H between the vertex of the cylindrical surface of the cylindrical lens 2 and the surface of the sub-pixel unit 13 away from the back plate 11 is optimized according to an actual thickness and the refractive index of a layer, so that the crosstalk of views between adjacent secondary sub-pixels is minimized. H=140.8 µm may be obtained according to the above formula, the optimized data is drawn into a curve as shown in FIG. 11. As may be seen from the curve in FIG. 11, the crosstalk between views formed by adjacent secondary sub-pixels at the optimal viewing distance is substantially 0.

TABLE 3

| Material | | Thickness (µm) | Refractive index |
|---|---|---|---|
| Circular polarizer | CAT | 40 | 1.51 |
| | PA | 5 | 1.26 |
| | LL | 6 | 1.52 |
| | ADH | 15 | 1.47 |
| Encapsulation layer | TFE2 | 0.6 | 1.89 |
| | IJP | 8 | 1.48 |
| | TFE1 | 0.8 | 1.78 |

The design parameters in table 4 are obtained by combining the calculation process for the above parameters and all of the known data of No. 1 in table 1.

TABLE 4

| Parameters for OLED | | | | Parameters for array of cylindrical lenses | | | | | | | | |
|---|---|---|---|---|---|---|---|---|---|---|---|---|
| Pitch between sub-pixels (μm) | Size Wx × Wy (mm) | Total thickness of encapsulation layer and polarizer (μm) | Maximum allowable temperature of polarizer | Size X × Y (mm) | Number | Refractive index n | Aperture Dy (μm) | Shrinking rate | Focal length f (μm) | Radius of curvature r (μm) | arch rise h (μm) | Placement height H (μm) |
| 36.6 × 54.9 | 59.292 × 105.408 | 66 + 9.4 = 75.4 | 80° C. | 59.292 × 105.37977 | 1920 | 1.56 | 54.8853 | 99.937% | 93.75 | 52.5 | 7.743 | 140.8 |

Figure 12:
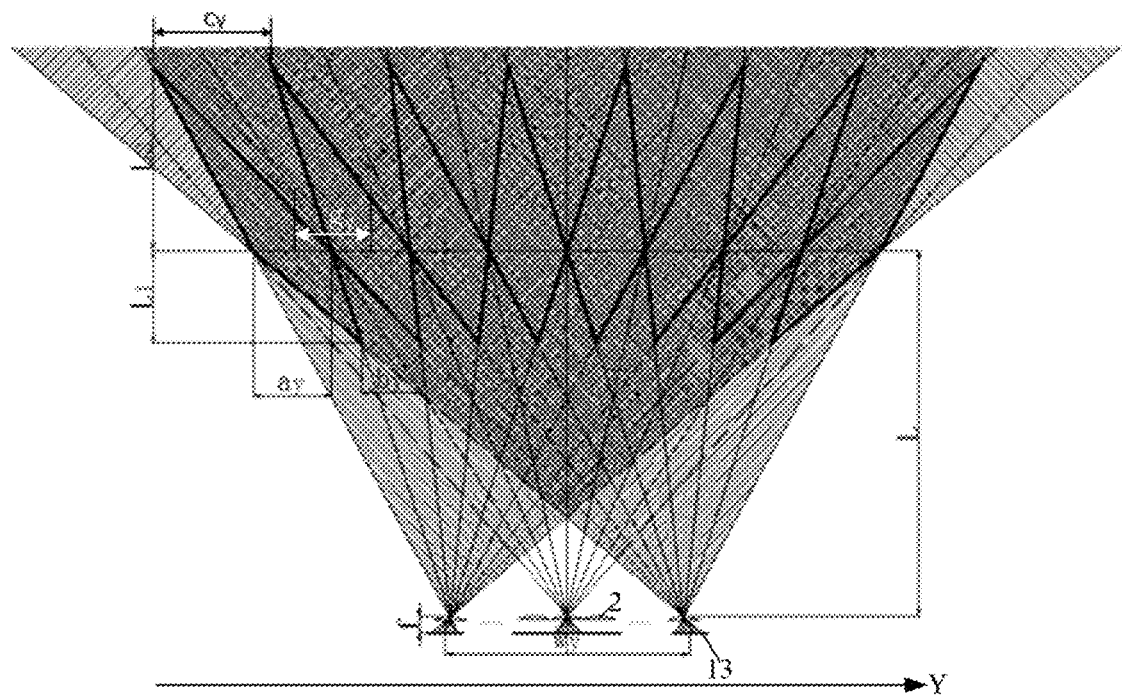
FIG. 12 is a schematic diagram illustrating sizes of views formed by sub-pixels in a sub-pixel unit according to an embodiment of the present disclosure.

Process: coining technology, directly forming on the OLED
Process accuracy
Size of lens in the Y direction: 105.37977 mm ± 0.0022 mm
Aperture of a lens: Dy = 54.8853 μm ± 0.05 μm
Radius of curvature: r = 52.5 μm ± 4 μm
Placement height: H = 140.8 μm ± 5 μm
Alignment accuracy: 5 μm (the whole view region is shifted by at most 24.5 mm)
PV value of surface accuracy < 0.5 μm
Surface roughness Ra < 10 nm In some embodiments, as shown in FIG. 12, in the array of sub-pixel units 13, a spatial projection of views formed by secondary sub-pixels arranged at same positions has a width $a_y$ along the first direction Y in a cross section at the optimal viewing distance for the display panel during the parallax 3D display, which satisfies:

$$a_y = \frac{Lt_y}{f}; \text{ and } a_y \leq e \text{`} Na_y \geq e,$$

where L is the optimal viewing distance for the display panel during the parallax 3D display; $t_y$ is a width of the secondary sub-pixel along the first direction Y; f is the focal length of the cylindrical lens 2; N is the number of secondary sub-pixels in sub-pixel unit 13; e is the pupil distance of the human eye.

In the array of sub-pixel units 13, a spatial projection of views formed by adjacent secondary sub-pixels has a pitch $b_y$ along the first direction Y in a cross section at the closest viewing distance for the display panel during the parallax 3D display, which satisfies:

$$b_y = \frac{w_y a_y}{w_y + a_y}; \text{ and } (N-1)b_y \geq e;$$

where $W_y$ is a length of the display substrate along the first direction Y.

In the sub-pixel unit array, the spatial projection of views formed by adjacent secondary sub-pixels has a pitch $c_y$ along the first direction Y in a cross section at the farthest viewing distance for the display panel during the parallax 3D display, which satisfies:

$$c_y = \frac{w_y a_y}{w_y - a_y}; \text{ and } c_y \leq e.$$

A shape of a cross section of the spatial projection of views formed by secondary sub-pixels arranged at same positions, which is perpendicular to a plane where the display substrate is located, is a rhombus, as shown in FIG. 12. Relational expressions of the parameters $a_y$, $b_y$ and $c_y$ in the rhombus are as follows:

$$\frac{a_y}{t_y} = \frac{L}{f};$$

$$\frac{a_y}{w_y} = \frac{L_1}{L - L_1} = \frac{L_2}{L + L_2};$$

$$\frac{b_y}{w_y} = \frac{L_1}{L};$$

$$\frac{c_y}{w_y} = \frac{L_2}{L};$$

Based on this, relational expressions are derived as follows:

$$a_y = \frac{Lt_y}{f};$$

$$L_1 = \frac{a_y L}{w_y + a_y};$$

$$L_2 = \frac{a_y L}{w_y - a_y};$$

$$b_y = \frac{w_y a_y}{w_y + a_y};$$

$$c_y = \frac{w_y a_y}{w_y - a_y};$$

where L1 is a distance from the closest viewing distance for the display panel during the parallax 3D display to the optimal viewing distance for the display panel during the parallax 3D display; L2 is a distance from the farthest viewing distance for the display panel during the parallax 3D display to the optimal viewing distance for the display panel during the parallax 3D display.

In order that a 3D visual region of the display panel at the optimal viewing distance during the parallax 3D display is continuous, and there are parallax 3D visual regions at the closest viewing distance and the farthest viewing distance, in the above formula, $a_y$ needs to satisfy $a_y \leq e$, $Na_y \geq e$; $b_y$ needs to satisfy $(N-1) b_y \geq e$; $c_y$ needs to satisfy $c_y \leq e$, which ensures that a good parallax 3D image may be viewed over the parallax 3D visual region.

Further, optionally, in the sub-pixel unit array, the width $a_y$ of the spatial projection of views formed by secondary sub-pixels arranged at same positions along the first direction Y in the cross section at the optimal viewing distance for the display panel during the parallax 3D display, is equal to a center pitch $g_y$ of the spatial projection of views formed by adjacent secondary sub-pixels along the first direction Y in the cross section at the optimal viewing distance for the display panel during the parallax 3D display. In this way, it further ensures that the 3D visual region of the display panel at the optimal viewing distance during the parallax 3D display is continuous.

Figure 13:
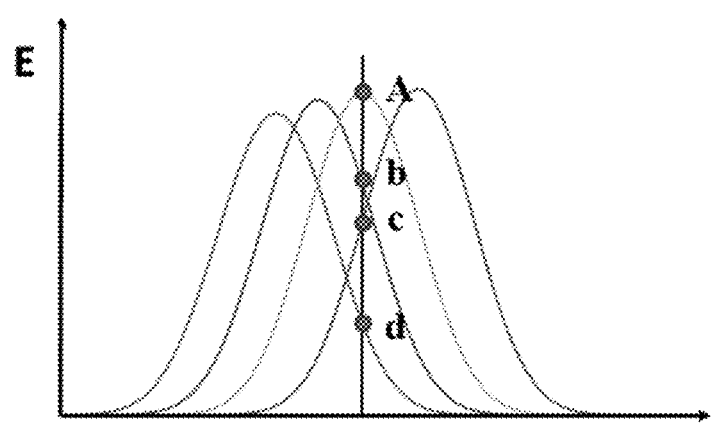
FIG. 13 is a schematic diagram illustrating a principle of a crosstalk occurring between views formed by sub-pixels.
Figure 14:
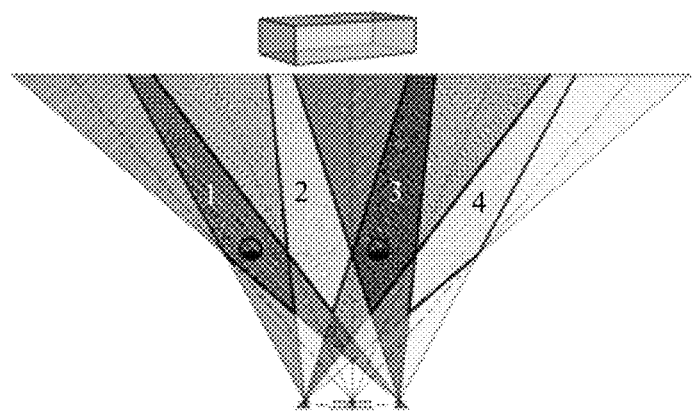
FIG. 14 is a schematic diagram of a 3D scene viewed by human eyes in views formed by sub-pixels 1 and 3 according to an embodiment of the present disclosure.
Figure 15:
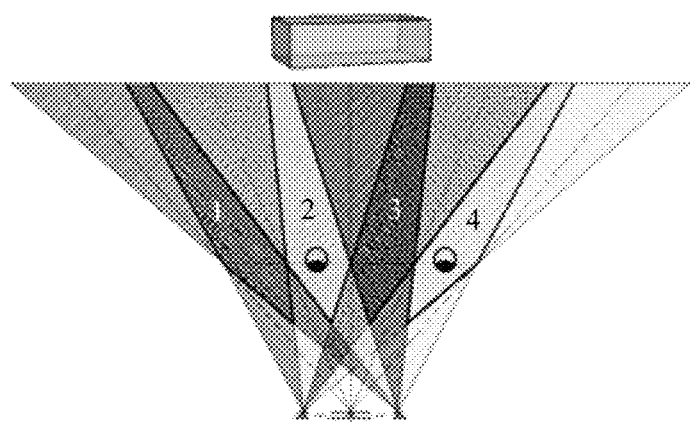
FIG. 15 is a schematic diagram of a 3D scene viewed by human eyes in views formed by sub-pixels 2 and 4 according to an embodiment of the present disclosure.

The crosstalk between views (inter-view crosstalk) formed by the secondary sub-pixels is defined as shown in FIG. 13, which is an interference of views of other secondary sub-pixels on a peak luminance (e.g., $E_A$) of a view of a target secondary sub-pixel, and is expressed as:

$$Crosstalk = \frac{E_b + E_c + E_d + \ldots}{E_A};$$

where $E_b$, $E_c$, $E_d$, and $E_A$ represent peak values of energy (such as light energy) at views of secondary sub-pixels, respectively. The smaller the crosstalk is, the larger the 3D image parallax is and the larger the resulting stereoscopic depth of field is. According to the effect analysis for the above parameters, the data shown in table 5 is obtained. It may be seen that in the multi-viewpoints parallax 3D display panel in this embodiment, the inter-view crosstalk is close to 0. That is, by setting the structure and parameters of the display panel in this embodiment, the crosstalk and the Moire fringe have no restriction relation therebetween, and therefore, an image with a large parallax may be generated, and a stereoscopic image with a large depth of field is realized. In addition, the obtained parallax 3D image may also change with the visual angle as viewed. As shown in FIG. 14 and FIG. 15, when human eyes are respectively in views 1, 3 and views 2, 4, 3D images at different angles may be observed.

TABLE 6

| Simulation No. | Aperture of cylindrical lens (um) | Radius of curvature (μm) | Placement height (μm) | Inter-view crosstalk level |
|---|---|---|---|---|
| 1 | 54.8353 | 48.5 | 135.8 | 0% |
| 2 | 54.8353 | 50.5 | 138.3 | 0% |
| 3 | 54.8353 | 54.5 | 143.3 | 0% |
| 4 | 54.8353 | 56.5 | 145.8 | 0% |
| 5 | 54.8603 | 48.5 | 145.8 | 0.5% |
| 6 | 54.8603 | 50.5 | 135.8 | 0% |
| 7 | 54.8603 | 54.5 | 138.3 | 0% |
| 8 | 54.8603 | 56.5 | 143.3 | 0% |
| 9 | 54.9103 | 48.5 | 143.3 | 10.0% |
| 10 | 54.9103 | 50.5 | 145.8 | 0.6% |
| 11 | 54.9103 | 54.5 | 135.8 | 0% |
| 12 | 54.9103 | 56.5 | 138.3 | 0% |
| 13 | 54.9353 | 48.5 | 138.3 | 15.9% |
| 14 | 54.9353 | 50.5 | 143.3 | 0% |
| 15 | 54.9353 | 54.5 | 145.8 | 0% |
| 16 | 54.9353 | 56.5 | 135.8 | 0% |

As may be seen from the data in table 6: the worst combination: No. 13 (the radius of curvature of 48.5 μm, the placement height of 138.3 μm) with the crosstalk value of 15.9%, and therefore the image parallax (3D depth of field) of the combination cannot be too large, otherwise the phenomenon of image un-fusion (i.e., a ghost) may occur; better combination: except Nos. 9 and 13, the rest crosstalk values of less than 6% all meet the requirement of a parallax 3D display industrial standard.

In some embodiments, the width of the non-light emitting region between adjacent secondary sub-pixels in the sub-pixel unit along the first direction Y is 0.05 μm or less. With the arrangement, the secondary sub-pixels may be ensured to continuously emit light, so that the influence of Moire fringes on the parallax 3D display is eliminated.

Figure 16:
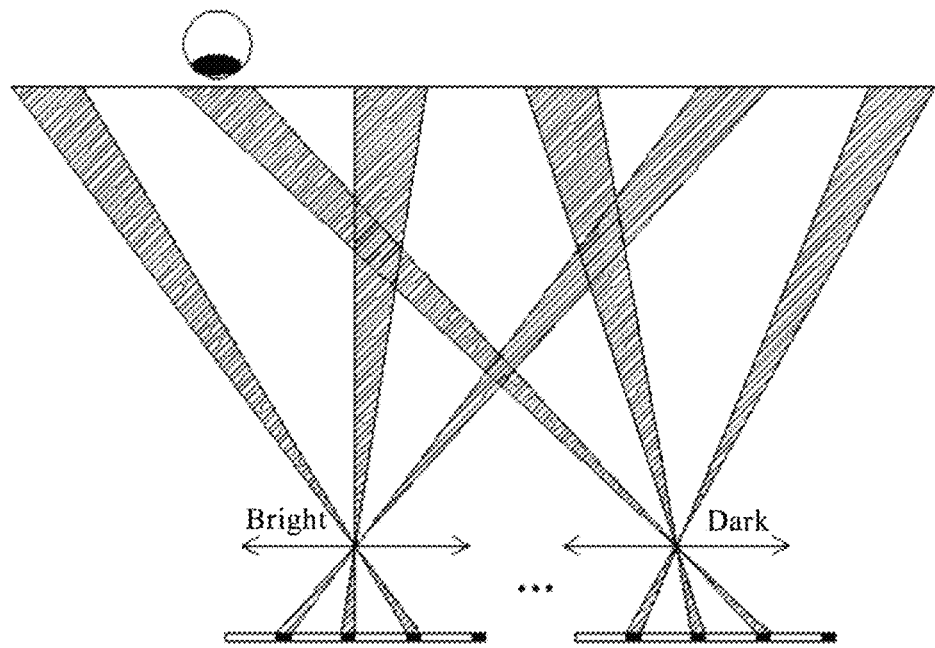
FIG. 16 is a schematic diagram illustrating a principle analysis for the influence of a discontinuous light emission of sub-pixels on a parallax 3D display effect.

Principle analysis of the influence of the discontinuous light emission of secondary sub-pixels on the parallax 3D display effect (i.e., cause analysis of generating the Moire fringes): as shown in FIG. 16, when the secondary sub-pixels emit light non-continuously, bright or dark regions

TABLE 5

| No | pitch between sub-pixel units | 1 × N | L (mm) | ay (mm) | L1 (mm) | L2 (mm) | by (mm) | cy (mm) | Main lobe visual angle | Views entering human eyes | Inter-view crosstalk | Continuity for visual angle |
|---|---|---|---|---|---|---|---|---|---|---|---|---|
| 1 | 20 μm | 1 × 4 | 350 | 32.573 | 82.625 | 156.53 | 24.884 | 47.171 | 21.09° | 1, 3 | 0% | Bad |
| 2 |  | 1 × 6 |  | 21.715 | 59.788 | 90.81 | 18.006 | 27.350 | 21.09° | 1, 4 | 0.9% | Medium |
| 3 |  | 1 × 12 |  | 13.002 | 38.431 | 49.25 | 11.574 | 14.831 | 25.13° | 1, 6 | 10.7% | Good |
| 4 | 16 μm | 1 × 4 |  | 32.498 | 82.478 | 156.00 | 24.839 | 46.982 | 21.04° | 1, 3 | 0% | Bad |
| 5 |  | 1 × 6 |  | 21.665 | 59.672 | 90.55 | 17.971 | 27.270 | 21.04° | 1, 4 | 0.2% | Medium |
| 6 |  | 1 × 12 |  | 13.002 | 38.431 | 49.25 | 11.574 | 14.831 | 25.13° | 1, 6 | 10.9% | Good |

Figure 17:
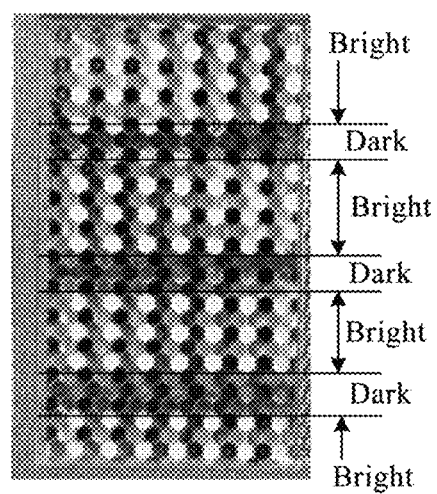
FIG. 17 is a schematic diagram of a Moire dark fringe phenomenon due to a discontinuous light emission of sub-pixels.
Figure 18:
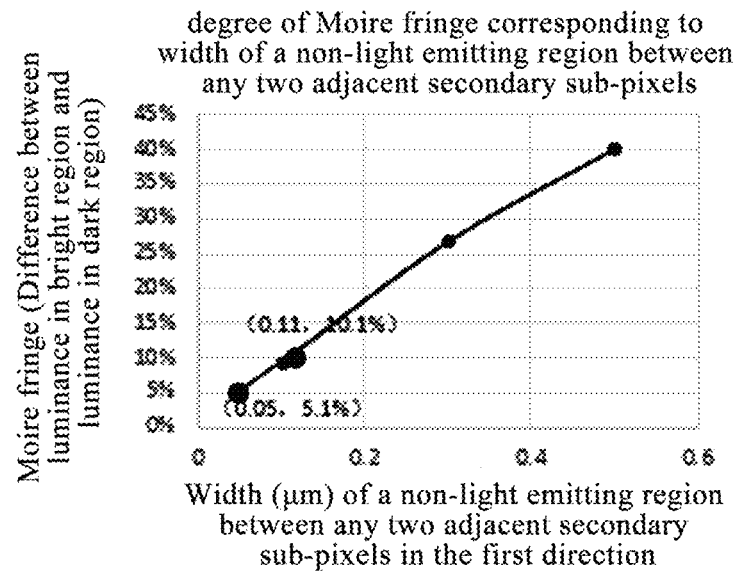
FIG. 18 is a graph showing a relationship between a width of a non-light emitting region between adjacent secondary sub-pixels and a degree of Moire fringe according to an embodiment of the present disclosure.

Analyzing the influence of the manufacturing process deviation of the cylindrical lens array on the parallax 3D display effect includes: an orthogonal simulated calculation is mainly performed on the radius of curvature, the aperture and the placement height of the cylindrical lens by using optical design software with reference to data of the process deviation of the parameters of the cylindrical lens array in table 4, to obtain 64 sets of simulation data, wherein the first 16 sets of data are shown in table 6 for illustration.

corresponding to the cylindrical lenses are observed, and all the dark regions in one row are connected together to form a phenomenon of Moire dark fringes similar to that shown in FIG. 17. The Moire intensity was defined by a difference between the luminance of the dark region and the luminance of the light-emitting region, and a correspondence between a width of a non-light emitting region between secondary sub-pixels and the Moire intensity was obtained through an optical software simulation, as shown in FIG. 18. When the difference between the luminance of the dark region and the luminance of the light-emitting region is of less than 5%, it cannot be recognized due to the characteristics of human eyes, so that it may be understood from the curve relationship between the width of the non-light emitting region between the secondary sub-pixels and the Moire intensity (i.e., degree of Moire fringe) in FIG. 18 that the Moire intensity is less than 5% when the width of the non-light emitting region between the secondary sub-pixels is less than 0.05 μm, and therefore, it may be considered that the parallax 3D display of the display panel is not influenced by the Moire and the secondary sub-pixels continuously emit light.

Figure 19:
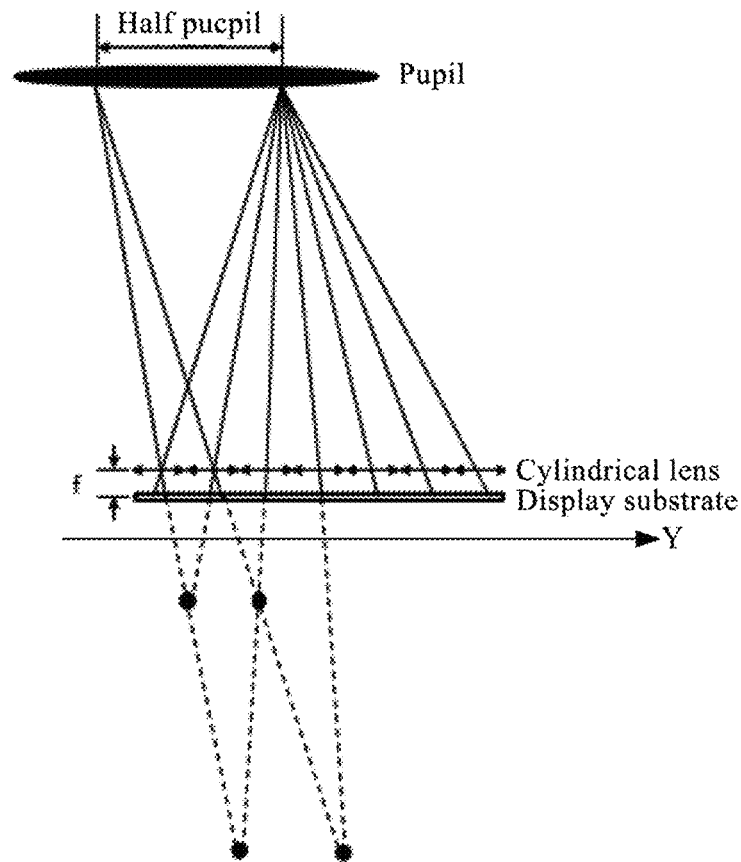
FIG. 19 is a schematic diagram of a light field in a display panel compatible with a light field 3D display according to an embodiment of the present disclosure.

In some embodiments, as shown in FIG. 19, a view region formed by the light emitted by the secondary sub-pixels propagating to a position of the pupil of the human eye has a size along the first direction Y which is smaller than or equal to a size of the half pupil of the human eye. In this way, in a case where the focus point of the cylindrical lens is located on the surface of the sub-pixel unit away from the back plate, the display panel may be compatible with near-to-eye light field display, the light field display is true 3D display which may be used to view different depths of field by focusing with a monocular crystalline lens as in the case of viewing the real world, so as to realize a transformation between clear scene and blurry scene in different depths of field, and such 3D display solves the problem of a visual fatigue due to a conflict between the monocular focusing and a binocular convergence.

Criterion of realizing the near-to-eye light field display are: I). the focus point of the cylindrical lens is positioned on the surface of the sub-pixel unit away from the back plate, so that the light emitted by the sub-pixel unit is collimated to form light in a single direction, wherein the light emitted by sub-pixel units in a known direction is called a light field in space (short for a light field); II). Intersection points are formed in the space by the light in the single direction entering the pupil, and are image points of light field imaging, wherein image points formed by the light from adjacent cylindrical lenses are positioned at a position near a screen, and image points formed by cylindrical lenses separated from each other are positioned at a position away from the screen. When the second criterion is satisfied, it is necessary that light from more than two adjacent secondary sub-pixels enters the pupil of a single eye (i.e., more than two viewpoints are located in the pupil of the single eye), and therefore, that the size of the view region, formed by the light emitted by the secondary sub-pixels propagating to a position of the pupil of the human eye, along the first direction Y is smaller than or equal to the size of the half pupil of the human eye.

Figure 20:
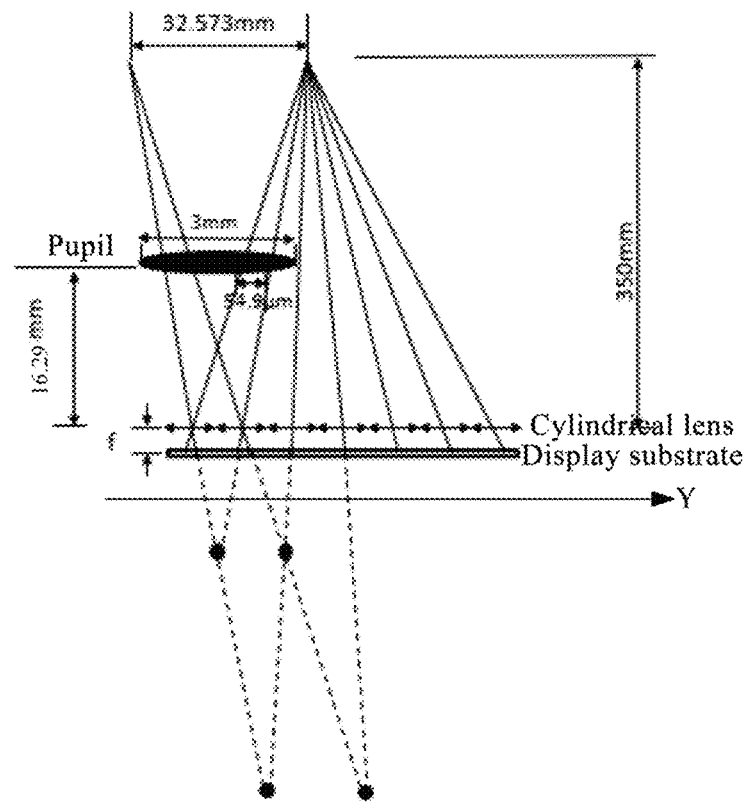
FIG. 20 is a schematic diagram of a light field in a display panel compatible with a light field 3D display with reference to specific parameter data for a structural design according to an embodiment of the present disclosure.

In this embodiment, the display panel capable of implementing the multi-viewpoints parallax 3D display is compatible with the true 3D light field display effect, which may be implemented only when human eyes are at a near-screen position. For example, as shown in parameters for structural design of No. 1 in the table 5 and in FIG. 20, the size of the view region, formed by the light emitted by the secondary sub-pixels propagating to a position of 350 mm from the cylindrical lens, along the first direction Y, is 32.573 mm, while the pupil of the human eye is usually only about 3 mm, so that the viewing distance (i.e., a distance of exit pupil) of the human eye needs to be smaller than or equal to 16.29 mm, which may achieve the size of the view region, formed by the light emitted by the secondary sub-pixels propagating to a position of the pupil of the human eye, along the first direction Y being smaller than or equal to the size of the half pupil of the human eye.

In this embodiment, according to the criterion of realizing the near-to-eye light field display, the distance of exit pupil, the number of light rays entering the eye, and an angle resolution (or imaging angle resolution) for implementing the near-to-eye light field display may be calculated, to evaluate the display effect of the near-to-eye light field display (that is, true 3D display).

Figure 21:
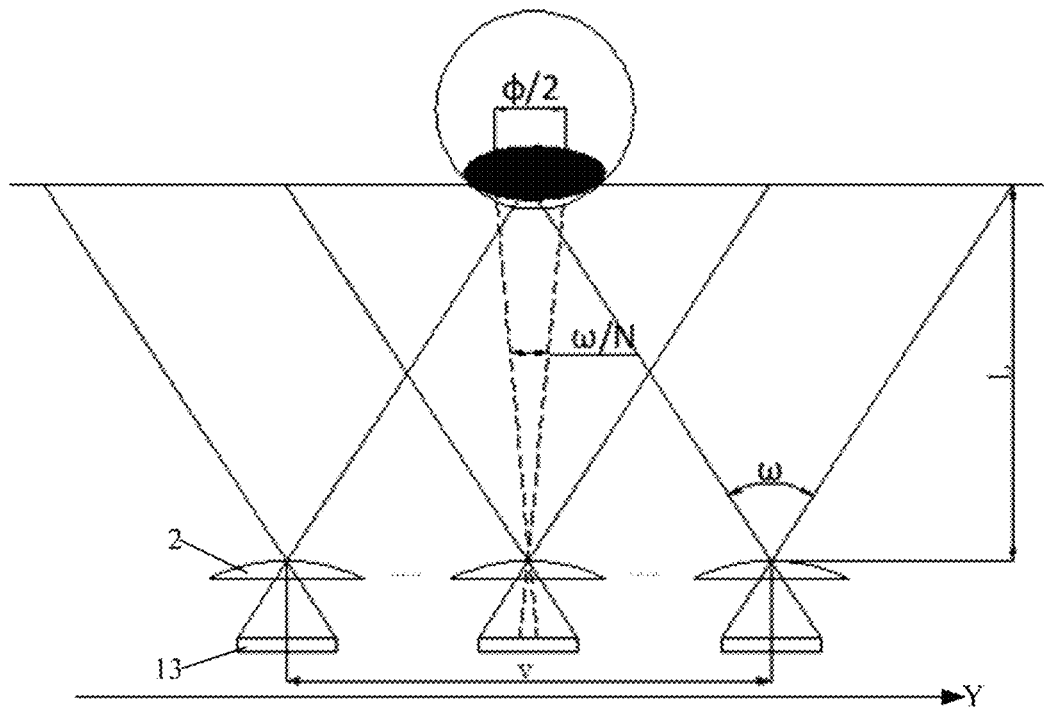
FIG. 21 is a schematic diagram illustrating the setting of distance of exit pupil which ensures that more than two viewpoints are always distributed in a pupil according to an embodiment of the present disclosure.

As shown in FIG. 21, to ensure that more than two viewpoints are always distributed in the pupil, the distance of exit pupil, i.e., a distance L between the pupil of the human eye and the display panel, satisfies:

$$6 \text{ mm} \le L \le \frac{\Phi/2}{2\tan\left(\frac{\omega/N}{2}\right)}$$

where 6 mm is the minimum distance, at which the eyelashes do not contact the array of cylindrical lenses 2; $\Phi$ is a diameter of the pupil of the human eye; $\omega$ is the main lobe visual angle of the cylindrical lens 2; N is the number of sub-pixels in sub-pixel unit 13. The larger a range of the distance of exit pupil is, the better the display effect of the near-to-eye light field display is.

The number M of the light rays entering the eye when the display panel performs the 3D light field display satisfies:

$$M = INT\left[\frac{\Phi}{2L\tan\left(\frac{\omega/N}{2}\right)}\right] * INT\left(\frac{v}{y}\right) * Z$$

where INT is a rounding-down function, $v = 2L\tan(\omega/2)$, and Z is the number of sub-pixel units arranged along the second direction X in the display substrate; $\Phi$ is the diameter of the pupil of the human eye; $\omega$ is the main lobe visual angle of the cylindrical lens 2; N is the number of secondary sub-pixels in sub-pixel unit 13. The more the number of the light rays entering the eye is, the more the number of the depths of field is, the more continuous the stereoscopic image of the light field 3D display is, and the better the light field 3D display effect is.

No matter the near-screen or the far-screen imaging, included angles of adjacent image points with respect to human eyes are equal to each other, so that the light field 3D display resolution of the display panel is evaluated by adopting the imaging angle resolution. The imaging angle resolution $\beta$ of the display panel during the 3D light field display satisfies:

$$\beta = \frac{D_y}{L} * \frac{180}{\pi} * 60$$

where $D_y$ is the aperture of the cylindrical lens 2; L is the distance between the pupil of the human eye and the display panel. The smaller the imaging angle resolution is, the higher the light field 3D display resolution is.

According to the evaluation parameters of the near-to-eye light field display (i.e. true 3D display): the distance of exit pupil, the number of the light rays entering the eye and the imaging angle resolution, the light field 3D display effect shown in the table 7 may be obtained by combining with the data in the tables 1 and 2.

TABLE 7

| 1 × N | Distance of exit pupil L (mm) | Number of the light rays entering the eye | Imaging angle resolution |
|---|---|---|---|
| 1 × 4 | 6–16.29 | 357898 | 31.5'–11.57' |
| 1 × 6 | 6–24.44 | 537058 | 31.5'–7.72' |
| 1 × 12 | 6–41.03 | 1079538 | 31.5'–4.60' |

Based on the above structure and parameters of the display panel, this embodiment further provides a display method of the display panel, including steps of: inputting image signals with different parallaxes to secondary sub-pixels in the sub-pixel unit of the display panel during the parallax 3D display of the display panel; and inputting image signals with a same parallax to secondary sub-pixels in the sub-pixel unit of the display panel during the 2D display of the display panel.

In this embodiment, the display method of the display panel further includes: inputting light field image signals to secondary sub-pixels in the sub-pixel unit of the display panel during the light field 3D display of the display panel.

In the display panel provided by the embodiment of the present disclosure, the sub-pixel unit includes at least two secondary sub-pixels, and the focus point of each cylindrical lens is located on the surface of a corresponding sub-pixel unit away from the back plate, such that secondary sub-pixels form at least two view regions on a visual space. By controlling a gray scale of a secondary sub-pixel and adjusting a viewing distance, a multi-viewpoints parallax 3D display compatible with the near-to-eye light field display and a 2D display with secondary sub-pixels of a same gray scale is achieved. In this way, the display panel not only may effectively reduce the crosstalk of parallax 3D display, but also improve the Moire phenomenon during the parallax 3D display and increase the stereo perception of the parallax 3D display. In addition, the display panel is compatible with the near-to-eye light field display (that is, the true 3D display), which may solve the problem of the visual fatigue due to a conflict between the monocular focusing and the binocular convergence.

The embodiment of the present disclosure further provides a display device, which includes the display panel in the above embodiment.

By adopting the display panel in the embodiment, the display effect of the parallax 3D display of the display device may be improved, the display device may be compatible with the light field 3D display, and the effect of the light field 3D display of the display device may be improved.

The display device provided by the exemplary embodiment of the present disclosure may be any product or component having a display function, such as an OLED panel, an OLED television, a display, a mobile phone, and a navigator.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A display panel, comprising a display substrate, a cylindrical lens array comprising cylindrical lenses on a light emitting side of the display substrate,
    wherein the display substrate comprises a back plate, a pixel definition layer and a sub-pixel unit array comprising sub-pixel units on the back plate, wherein each of the sub-pixel units is in a pixel region defined by the pixel definition layer and comprises at least two secondary sub-pixels;
    the cylindrical lenses are arranged corresponding to the sub-pixel units, each cylindrical lens has a cylindrical surface away from the back plate, and a focus point in a surface of a corresponding sub-pixel unit away from the back plate,
    the secondary sub-pixels are arranged in a first direction; an axis of the cylindrical lens is perpendicular to the first direction; an extending direction of the axis is a second direction;
    the display substrate has a shape of rectangle, a long side of the display substrate extends along the first direction, and a wide side of the display substrate extends along the second direction;
    the sub-pixel unit has a shape of rectangle, a long side of the sub-pixel unit extends in the first direction, and a wide side of the sub-pixel unit extends in the second direction; and
    the secondary sub-pixel has a shape of rectangle, a wide side of the secondary sub-pixel extends in the first direction, and a long side of the secondary sub-pixel extends in the second direction,
    the sub-pixel units in the sub-pixel unit array have the same size and shape; and
    the secondary sub-pixels in each sub-pixel unit have the same size and shape, and
    a main lobe visual angle of the cylindrical lens and a focal length of the cylindrical lens satisfy:

$$\tan\frac{\omega}{2} = \frac{Np_y}{2f}; \frac{\alpha}{\omega/N} = i$$

where ω is the main lobe visual angle of the cylindrical lens; N is a number of the secondary sub-pixels in the sub-pixel unit; py is a distance between centers of two adjacent secondary sub-pixels in the sub-pixel unit f is the focal length of the cylindrical lens; i=1, 2, 3 . . . , i being an integer; and α is an included angle of a pupil distance of human eyes with respect to the display substrate.

2. The display panel according to claim 1, wherein an orthographic projection of the cylindrical lens on the back plate falls within an orthographic projection of the corresponding sub-pixel unit on the back plate; and an aperture of the cylindrical lens satisfies:

$$\frac{D_y}{y} = \frac{W_{lens}}{W_{panel}} = \frac{L}{L+f}$$

where Dy is the aperture of the cylindrical lens; y is a length of the sub-pixel unit along the first direction; Wlens is a length of the cylindrical lens array along the first direction; Wpanel is a length of the display substrate along the first direction; L is an optimal viewing distance of the display panel during a parallax 3D display; f is the focal length of the cylindrical lens.

3. The display panel according to claim 2, further comprising m layers between the cylindrical lens and the sub-pixel unit, wherein
a distance H between a vertex of a cylindrical surface of the cylindrical lens and a surface of the sub-pixel unit away from the back plate, satisfies:

$$h/n + h1/n1 + h2/n2 + \ldots + hm/nm = f; H = h + h1 + h2 + \ldots + hm,$$

where h is a thickness of the cylindrical lens, and n is the refractive index of the cylindrical lens; h1 is a thickness of a first layer between the cylindrical lens and the sub-pixel unit, and n1 is a refractive index of the first layer; h2 is a thickness of a second layer between the cylindrical lens and the sub-pixel unit, and n2 is a refractive index of the second layer; hm is a thickness of an mth layer between the cylindrical lens and the sub-pixel unit, and nm is a refractive index of the mth layer; and f is the focal length of the cylindrical lens.

4. The display panel according to claim 3, wherein
in the sub-pixel unit array, a spatial projection of views formed by secondary sub-pixels arranged at same positions has a width $a_y$ along the first direction in a cross section at the optimal viewing distance for the display panel during the parallax 3D display, which satisfies:

$$a_y = \frac{Lt_y}{f}; \text{ and } a_y \leq e \text{`} Na_y \geq e,$$

where L is the optimal viewing distance for the display panel during the parallax 3D display; $t_y$ is a width of the secondary sub-pixel along the first direction; f is the focal length of the cylindrical lens; N is the number of secondary sub-pixels in the sub-pixel unit; e is the pupil distance of the human eyes;

in the sub-pixel unit array, a spatial projection of views formed by adjacent secondary sub-pixels has a pitch $b_y$ along the first direction in a cross section at a closest viewing distance for the display panel during the parallax 3D display, which satisfies:

$$b_y = \frac{w_y a_y}{w_y + a_y}; \text{ and } (N-1)b_y \geq e;$$

where $W_y$ is a length of the display substrate along the first direction; and
in the sub-pixel unit array, the spatial projection of views formed by adjacent secondary sub-pixels has a pitch $c_y$ along the first direction in a cross section at a farthest viewing distance for the display panel during the parallax 3D display, which satisfies:

$$c_y = \frac{w_y a_y}{w_y - a_y}; \text{ and } c_y \leq e.$$

5. The display panel according to claim 4, wherein
in the sub-pixel unit array, the width of the spatial projection of views formed by the secondary sub-pixels arranged at same positions along the first direction in the cross section at the optimal viewing distance for the display panel during the parallax 3D display, is equal to a center pitch of the spatial projection of views formed by adjacent secondary sub-pixels along the first direction in the cross section at the optimal viewing distance for the display panel during the parallax 3D display.

6. The display panel according to claim 5, wherein
a width of a non-light emitting region between adjacent secondary sub-pixels in the sub-pixel unit in the first direction is 0.05 μm or less.

7. The display panel according to claim 3, wherein
a view region formed by light emitted by the secondary sub-pixels propagating to a position of a pupil of the human eye has a size along the first direction, which is smaller than or equal to a size of a half pupil of the human eye.

8. The display panel according to claim 7, wherein
a distance L between the pupil of the human eye and the display panel, satisfies:

$$6 \text{ mm} \leq L \leq \frac{\Phi/2}{2\tan\left(\frac{\omega/N}{2}\right)}$$

where 6 mm is a minimum distance at which eyelashes do not contact the cylindrical lenses array; $\Phi$ is a diameter of the pupil of the human eye; $\omega$ is the main lobe visual angle of the cylindrical lens; N is the number of the secondary sub-pixels in the sub-pixel unit.

9. The display panel according to claim 8, wherein
a number M of light rays entering the human eye during 3D light field display of the display panel, satisfies:

$$M = INT\left[\frac{\Phi}{2L\tan\left(\frac{\omega/N}{2}\right)}\right] * INT\left(\frac{v}{y}\right) * Z$$

where INT is a rounding-down function, $v = 2L\tan(\omega/2)$, and Z is a number of sub-pixel units arranged along the second direction in the display substrate; $\Phi$ is the diameter of the pupil of the human eye; $\omega$ is the main lobe visual angle of the cylindrical lens; N is the number of the secondary sub-pixels in sub-pixel unit.

10. The display panel according to claim 9, wherein
an imaging angle resolution β of the display panel during the 3D light field display, satisfies:

$$\beta = \frac{D_y}{L} * \frac{180}{\pi} * 60$$

where $D_y$ is the aperture of the cylindrical lens; L is the distance between the pupil of the human eye and the display panel.

11. A display device, comprising the display panel according to claim 1.

12. A display method of a display panel, wherein the display panel is the display panel according to claim 1, the display method comprises steps of:
inputting image signals with different parallaxes to the secondary sub-pixels in the sub-pixel unit of the display panel during parallax 3D display of the display panel; and
inputting image signals with a same parallax to the secondary sub-pixels in the sub-pixel unit of the display panel during 2D display of the display panel.

13. A display method of a display panel, wherein the display panel is the display panel according to claim 3, the display method comprises steps of:

inputting image signals with different parallaxes to the secondary sub-pixels in the sub-pixel unit of the display panel during parallax 3D display of the display panel; and inputting image signals with a same parallax to the secondary sub-pixels in the sub-pixel unit of the display panel during 2D display of the display panel; and inputting light field image signals to the secondary sub-pixels in the sub-pixel unit of the display panel during light field 3D display of the display panel.

* * * * *